(12) United States Patent
Ray (10) Patent No.: US 7,752,237 B2
(45) Date of Patent: Jul. 6, 2010

(54) USER INTERFACE HAVING A SEARCH PREVIEW

(75) Inventor: Ethan Ray, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 64 days.

(21) Appl. No.: 11/276,813

(22) Filed: Mar. 15, 2006

(65) Prior Publication Data

US 2007/0220447 A1 Sep. 20, 2007

(51) Int. Cl.
G06F 17/30 (2006.01)
(52) U.S. Cl. ..................................... 707/805
(58) Field of Classification Search ........................ None
See application file for complete search history.

(56) References Cited

U.S. PATENT DOCUMENTS

| | | | | |
|---|---|---|---|---|
| 6,594,670 | B1* | 7/2003 | Genser | 707/102 |
| 7,089,237 | B2* | 8/2006 | Turnbull et al. | 707/5 |
| 7,257,604 | B1* | 8/2007 | Wolfe | 707/104.1 |
| 2001/0030660 | A1* | 10/2001 | Zainoulline | 345/720 |
| 2002/0080170 | A1* | 6/2002 | Goldberg et al. | 345/748 |
| 2002/0082877 | A1* | 6/2002 | Schiff et al. | 705/5 |
| 2003/0208578 | A1* | 11/2003 | Taraborelli et al. | 709/223 |
| 2003/0212737 | A1* | 11/2003 | Moricz et al. | 709/202 |
| 2004/0153445 | A1* | 8/2004 | Horvitz et al. | 707/3 |
| 2005/0120016 | A1* | 6/2005 | Midgley | 707/5 |
| 2005/0144133 | A1* | 6/2005 | Hoffman et al. | 705/50 |
| 2006/0047704 | A1* | 3/2006 | Gopalakrishnan | 707/104.1 |
| 2006/0095424 | A1* | 5/2006 | Petropoulos et al. | 707/3 |
| 2006/0122976 | A1* | 6/2006 | Baluja et al. | 707/3 |
| 2006/0248078 | A1* | 11/2006 | Gross et al. | 707/5 |
| 2006/0277167 | A1* | 12/2006 | Gross et al. | 707/3 |
| 2006/0294476 | A1* | 12/2006 | Buckley | 715/781 |
| 2007/0061317 | A1* | 3/2007 | Ramer et al. | 707/4 |
| 2007/0128899 | A1* | 6/2007 | Mayer | 439/152 |
| 2007/0130129 | A1* | 6/2007 | Wagle | 707/3 |
| 2007/0162936 | A1* | 7/2007 | Stallings et al. | 725/58 |
| 2007/0174244 | A1* | 7/2007 | Jones | 707/3 |
| 2007/0174286 | A1* | 7/2007 | Seitz et al. | 707/10 |
| 2007/0196033 | A1* | 8/2007 | Russo | 382/305 |
| 2007/0255702 | A1* | 11/2007 | Orme | 707/5 |
| 2007/0299813 | A1* | 12/2007 | Subramaniam et al. | 707/2 |

\* cited by examiner

*Primary Examiner*—Neveen Abel Jalil
*Assistant Examiner*—Bai D Vu
(74) *Attorney, Agent, or Firm*—Lee & Hayes, PLLC (57) ABSTRACT

A user interface having a search preview is described. In an implementation, one or more characters are received that are input via a search portion of a user interface. When a cursor is positioned proximally to one of a plurality of services in the user interface after the one or more characters are received, a preview is displayed of a search performed using the received one or more characters with the selected said service.

19 Claims, 9 Drawing Sheets

USER INTERFACE HAVING A SEARCH PREVIEW

BACKGROUND

A vast amount of content is available to users over a network, and the amount is ever increasing. For example, users currently have access to billions of web pages via the Internet. Further, the types of content that are available are also increasing, from web pages to images to downloadable music and so on. Therefore, it may be difficult for the users to locate particular content of interest from this amount and types of content One technique that was traditionally utilized to locate desired content was through the use of an Internet search engine, also commonly known as a "search engine". A search engine is typically accessed via a particular web site address and works as a stand-alone program that maintains a database of information collected over the Internet. For example, the search engine may search web pages and store information relating to this search as an indexed database. This information may then used similar as a card catalog to locate a particular web page of interest, such as a web page having keywords that were provided by a user.

Traditional search engines, however, were provided as a "destination" itself. Thus, a user navigated to the particular web site address of the search engine to then locate content of interest. The user then navigated from that web site address to other web site addresses having desired content. Therefore, the user may be forced to manually navigate from a particular experience (e.g., typing of a letter) to multiple network addresses to locate desired content, which may disrupt the user's interaction with the particular experience.

SUMMARY

A user interface having a search preview is described. In an implementation, one or more characters are received that are input via a search portion of a user interface. When a cursor is positioned proximally to one of a plurality of services in the user interface after the one or more characters are received, a preview is displayed of a search performed using the received one or more characters with the selected service. The preview may be displayed in a variety of ways, such as through use of an overlay.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

To locate content over the Internet, users typically interact with search engines that are accessed by the user via browser navigation to a particular web address. Thus, traditional search engines were typically provided in an experience separate from other experiences of the user. For example, a user may participate in an instant messaging session and wish to locate a particular piece of information that was brought up during discussion. To find the information, a user typically opened a browser separately from the instant messaging session and navigated to the particular web site address of a search engine. Once at the particular web site, the user then performed a search to locate another web site having the particular piece of information and then navigated to that web site. In this example, the user manually navigated from a particular experience (e.g., the instant messaging session) to other experiences (e.g., the browser and corresponding multiple network addresses) to locate the desired content, which disrupted the user's interaction with the desired initial experience.

Accordingly, in an exemplary implementation techniques are described, in which, search functionality is provided within multiple experiences. For example, a user may have access to multiple services provided by a service provider, such as instant messaging, email, web logs (blogs), and so on. Search functionality may be provided in a user interface that is configured to access each of these services such that the user may perform searches without leaving the experiences.

The search functionality may be provided in a variety of ways. For example, a search portion (e.g., a search window) may be displayed with representations of services in a user interface. The services that are displayed in the user interface may be refined as characters are entered into the search portion. For instance, the user may enter text which describes a particular painting, such as "starry night". From this text, it may be determined that the user is likely to desire a search to be performed in images as well as an Internet search. Therefore, representations of the respective services (e.g., "images" and "web") may be displayed that are selectable to cause a search to be performed in the represented service. Further, the refining may be performed as the user is entering the text, such that the services displayed when the user enters the text "star" (e.g., a news service for gossip relating to the "stars") are different from the services displayed for the text "starry night", e.g., images, book search, and so on. Further discussion of refinement of a listing of services in a user interface may be found in relation to FIGS. 4-5.

In another example, searches may also be performed for matching items as characters are received in the search portion such that a listing of items which correspond to the characters is refined as the characters are entered. For instance, the user may interact with an email service and enter text in the search portion. As the user enters text, a search may be continually performed to locate email having the entered text. Therefore, the user is provided with feedback as the characters are entered and may use this feedback to locate a desired item of interest. Additionally, this feedback may be provided as an overlay such that the user remains in the desired experience (e.g., the email service) without navigating to another service. Further discussion of refinement of items in a user interface may also be found in relation to FIGS. 4-5.

In a further example, items configured as search term suggestions may be output as the user enters characters. For example, when the user interacts with a web search service, search term suggestions may be output based on characters that are currently entered in a search portion and further refined as additional characters are entered. The search term suggestions may also be made selectable to perform an Internet search using those terms. Further discussion of search term suggestions may also be found in relation to FIGS. 6-7.

In yet another example, a search preview is provided. For example, a user may input characters (e.g., text) into a search portion in a user interface that includes representations of other services. The user may then position a cursor proximally to one or more of the representations to display a preview of a search that is performable using the text in relation to the service. Therefore, the user may preview the search without navigating away from a current experience. Further discussion of search preview may be found in relation to FIGS. 8-9.

In the following discussion, an exemplary environment is first described that is operable to employ the refining, preview and overlay techniques previously described, as well as other techniques. Exemplary procedures are then described which may be employed by the exemplary environment, as well as in other environments.

Exemplary Environment

Figure 1:
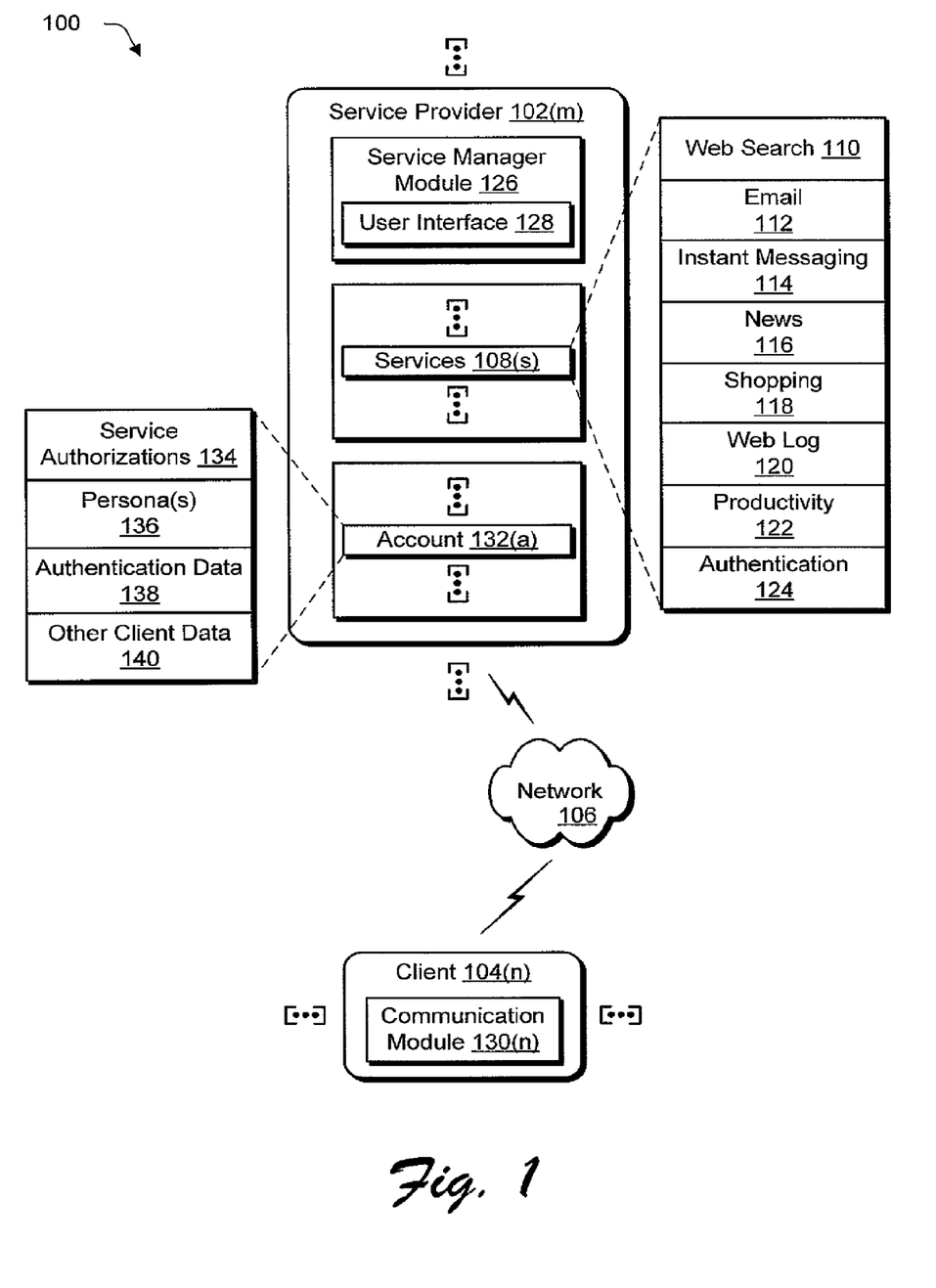
FIG. 1 is an illustration of an environment in an exemplary implementation that is operable to employ preview and refinement techniques.

FIG. 1 is an illustration of an environment 100 in an exemplary implementation that is operable to employ preview and refinement techniques. The illustrated environment 100 includes a plurality of service providers 102(m) (where "m" can be any integer from one to "M") and a plurality of clients 104(n) (where "n" can be any integer from one to "N") that are communicatively coupled over a network 106.

The clients 104(n) may be configured in a variety of ways for accessing the service provider 102(m). For example, one or more of the clients 104(n) may be configured as a computing device, such as a desktop computer, a mobile station, an entertainment appliance, a set-top box communicatively coupled to a display device, a wireless phone, a game console, and so forth. Thus, the clients 104(n) may range from full resource devices with substantial memory and processor resources (e.g., personal computers, game consoles) to low-resource devices with limited memory, processing and/or display resources (e.g., traditional set-top boxes, hand-held game consoles, wireless phones). For purposes of the following discussion, the clients 104(n) may also relate to a person and/or entity that operate the clients. In other words, one or more of the clients 104(n) may describe logical clients that include users, software, and/or devices.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The service provider 102(m) is illustrated as having a plurality of services 108(s) (where "s" can be any integer from one to "S") that are accessible via the network 106. The services 108(s) may be configured in a variety of ways to provide functionality over the network 106 to the clients 104(n). For example, the services 108(s) may be configured for access via platform-independent protocols and standards to exchange data over the network 106. The services 108(s), for instance, may be provided via an Internet-hosted module that is accessed via standardized network protocols, such as a simple object access protocol (SOAP) over hypertext transfer protocol (HTTP), extensible markup language (XML), and so on, further discussion of which may be found in relation to FIG. 2.

A wide functionality may be made available via the plurality of services 108(s). For example, a web search 110 service (e.g., a search engine) may be provided to search the Internet, an email 112 service may be provided to send and receive email, and an instant messaging 114 service may be provided to provide instant messaging between the clients 104(n). Additional examples include a news 116 service, a shopping (e.g., "ecommerce") 118 service, and a web log 120 service. Further, productivity 122 services may also be provided, such as word processing, spreadsheets, presentations, drawings, note-taking, and so on. For instance, network access may be given to the client 104(n) to applications that were traditionally executed locally on the client 104(n) itself. Therefore, execution of the application modules may be performed remotely at the service provider 102(m) and results of the execution may be communicated over the network 106 to the client 104(n). An authentication service 124 may also be provided to authenticate clients 104(n) to access other services, which may include other services provided by the service provider 102(m) as well as other services provided by other service providers. Although a few examples of services have been described, it should be apparent that a wide variety of other services are also contemplated.

The service provider 102(m) is also illustrated as having a service manager module 128, which is representative of functionality used by the service provider 102(m) to manage access to the services 108(s) over the network 106, performance of the services 108(s), and so on. Although illustrated separately, the functionality represented by the service manager module 128 may be incorporated within the services 110(s) themselves.

The service manager module 126, for instance, may be utilized to generate a user interface 128 that is provided over the network 106 to the client 104(n) to enable the client 104(n) to interact with the services 108(s). For example, the user interface 128 may be output through use of a communication module 130(n) that is executable on the client 104(n) to render the user interface 128, and more particularly data used to form the user interface.

Additionally, the service manager module 126 may manage a plurality of accounts 132(a) (where "a" can be any integer from one to "A"), each of which represents data that is utilized for interaction by the clients 104(n) with the plurality of service 108(s). For example, the account 132(a) may correspond to a particular client 104(n) and include service authorizations 134 which indicate which services 108(s), with which, the client 104(n) is permitted to interact.

The account 132(a) may also include one or more persona(s) 136 of the client 104(n), which are used to provide different external representations of the client 104(n). For instance, a "work" persona may be utilized by the client 104(n) for interactions related to work (e.g., work email and instant messaging) and a "personal" persona may be used to interact with family and friends. Each persona may provide a different external representation for how other clients "see" the client, such as a different email address, user tile, and so on. The account 132(a) may also include authentication data 138 (e.g., name and password) that is used to authenticate the client's 104(n) identity. A wide variety of other client data 140 is also contemplated, such as personalized emoticons, audio files, and so on.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the refinement and rendering techniques described below are platform-independent, meaning that the techniques may be implemented on a variety of commercial computing platforms having a variety of processors.

Figure 2:
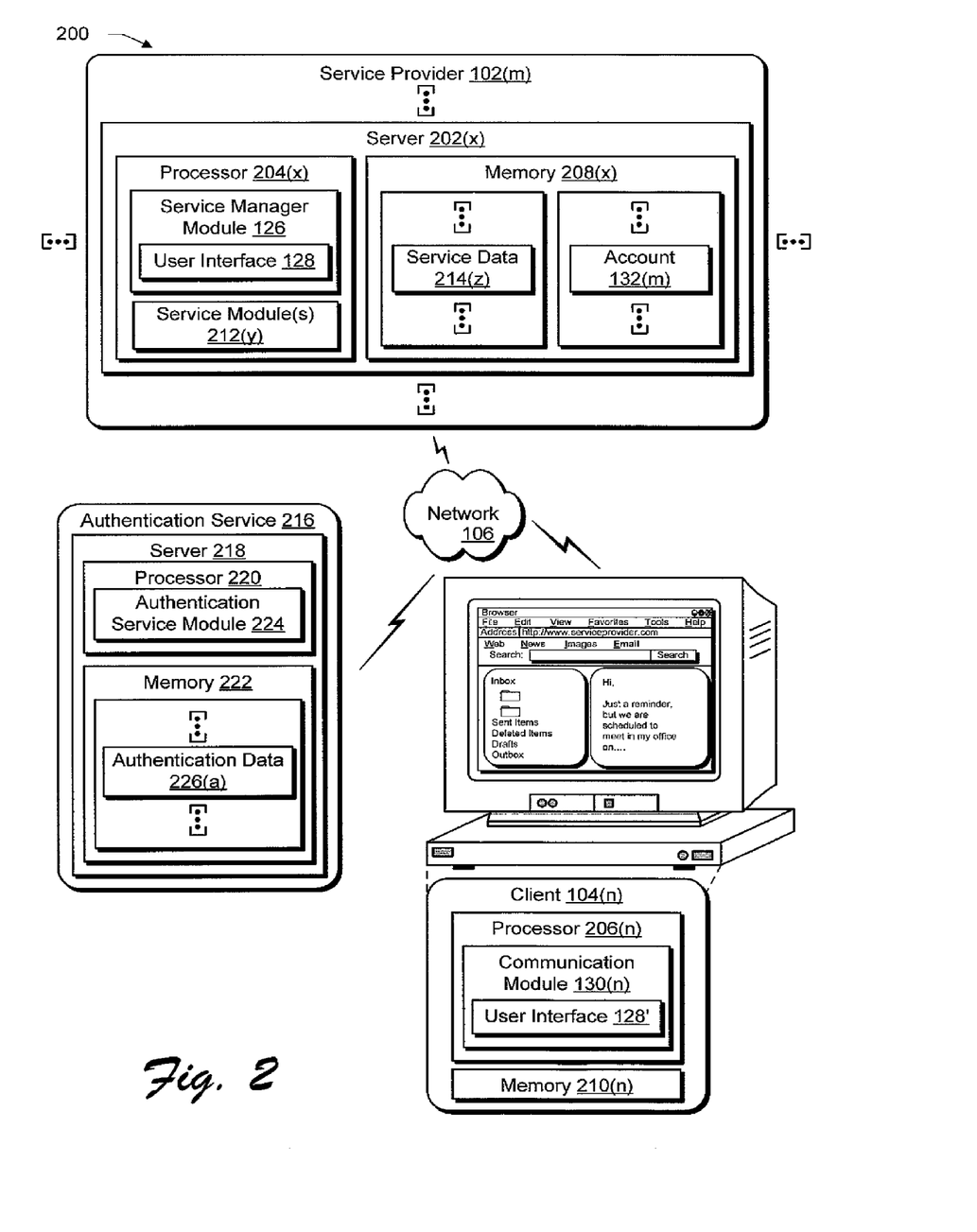
FIG. 2 is an illustration of a system in an exemplary implementation showing a service provider and client of FIG. 1 in greater detail.

FIG. 2 is an illustration of a system 200 in an exemplary implementation showing the service provider 102(m) and the client 104(n) in greater detail. In FIG. 2, the service provider 102(m) is illustrated as being implemented by a plurality of servers 202(x) (where "x" can be any integer from one to "X") and the client 104(n) is illustrated as a client device.

The server 202(x) and the client 104(n) each include a respective processor 204(x), 206(n) and respective memory 208(x), 210(n). Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208(x), 210(n) is shown, respectively, for the server 202(x) and the client 104 (n), a wide variety of types and combinations of memory may be employed, such as random access memory (RAM), hard disk memory, removable medium memory, and so forth.

As previously described, the services 108(s) of FIG. 1 may be configured in a variety of ways to provide functionality over the network 106 to the client 104(n). For example, the services 108(s) may be provided via one or more service module(s) 212(y), which are illustrated as being executed on the processor 204(x) and are storable in memory 208(x). The service modules(s) 212(y) in this instance are configured as an Internet-hosted module that is accessed via standardized network protocols. The service module(s) 212(y), when executed, may also use respective service data 214(z) to provide corresponding functionality. For example, service module 212(y) may be configured as an Internet search module (e.g., a search engine) that examines service data 214(z) configured as an indexed search database to provide Internet searches. A variety of other examples are also contemplated.

Additionally, a service may also be provided as a standalone service. For example, an authentication service 216 may be provided by a server 218 configured for network 106 access and that has a processor 220 and memory 222. The authentication service 216 includes an authentication service module 224 that is executable on the processor 220 to authenticate the client 104(n) using authentication data 226(a), where "a" can be any integer from one to "A". For instance, the client 104(n) may provide a name and password which is authenticated by the authentication service module 224 using the authentication data 226(a). When the authentication is successful (i.e., the client 104(n) "is who they say they are"), the authentication service module 224 may pass a token to the client 104(n) that is used by the client 104(n) to access services 110(s) of the service provider 102(m). The token may also be used to access other services by other service providers such that the client 104(n) is not forced to re-authenticate to access each of the plurality of service providers 102(m). A variety of other examples are also contemplated.

The service manager module 126 is also illustrated as being executed on the processor 204(x) and is storable in memory 208(x) of the serer 202(x). As previously described, the service manager module 126 is representative of functionality that manages interaction of the client 104(n) with the plurality of services 110(s) of FIG. 1, which are implemented by the service module(s) 212(y) and service data 214(z) of FIG. 2. For instance, the service manager module 126 may provide data sufficient to form a user interface 128. This data may be communicated over the network 106 to the client 104(n) and used by the communication module 130(n) (which is illustrated as being executed on the processor 206 (n) and is storable in memory 210(n)) to output user interface 128'. The user interface 128' may be configured in a variety of ways to provide this interaction, further discussion of which may be found in relation to the following figure.

Figure 3:
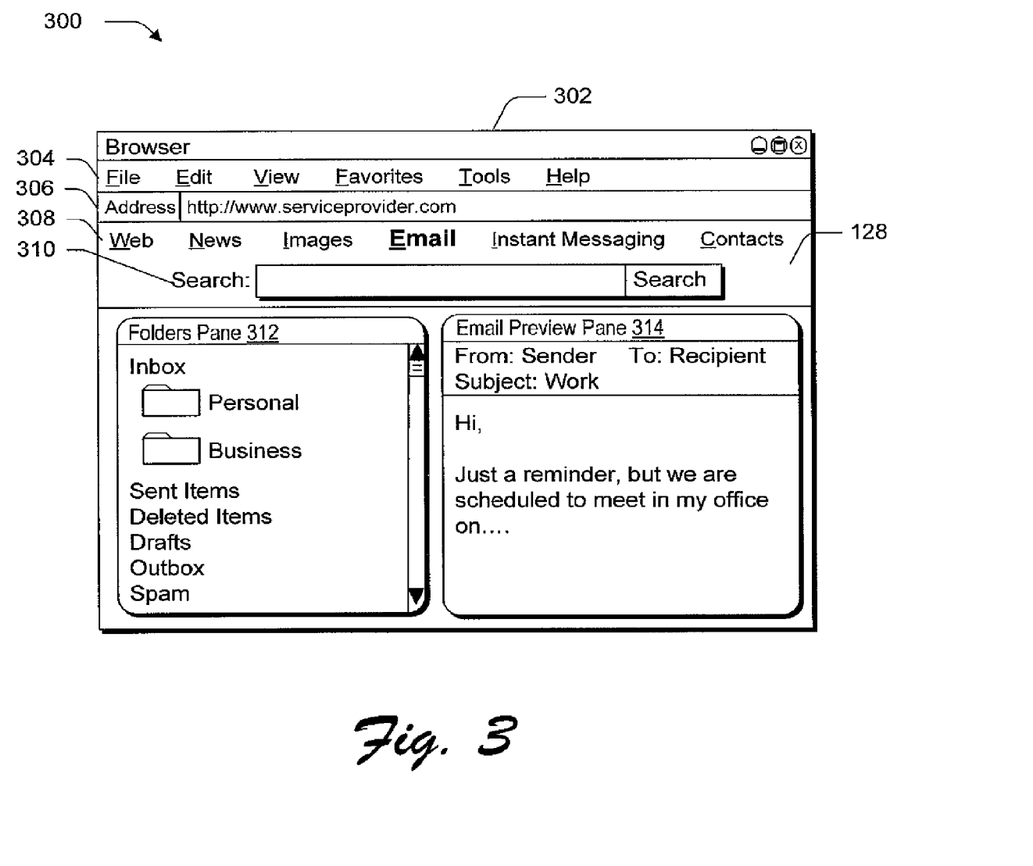
FIG. 3 is an illustration of an exemplary implementation showing a user interface of FIG. 2 in greater detail.

FIG. 3 illustrates an exemplary implementation 300 showing the user interface 128 of FIG. 2 in greater detail. The user interface 128 provided by the service provider 102(m) in this instance is illustrated as incorporated within a user interface 302 provided by the communication module 130(n). For example, the communication module 130(n) may be configured as a browser that includes a menu bar 304 and an address bar 306. The menu bar 304 is a portion of the user interface 302 that includes drop-down menus of commands, examples of which are illustrated as "file", "edit", "favorites", "tools" and "help". The address bar 306 is configured to receive inputs to navigate to particular network addresses and/or display current network addresses, from which, the client 104(n) has received content and is being displayed.

The user interface 302 also includes a user interface 128 formed from data obtained via the network 106 from the service provider 102(m). The user interface 128 formed from the service provider 102(m) data includes a service bar 308 that includes representations of services that are available from the service provider 102(m), examples of which are illustrated as "web" (e.g., for an Internet search service), "news" (e.g., for a news service), "images" (e.g., for an image search service), "email", "instant messaging", and "contacts". A variety of other services are also contemplated.

The user interface 128 formed from data obtained from the service provider 102(m) also includes a search portion 310 that is operable to receive characters (e.g., text) input by a user to perform a search. Items found as a result of the search may then be displayed elsewhere in the user interface 128. For instance, the illustrated user interface 128 currently provides interaction with an email service, as illustrated by the bolding of the Email representation in the service bar 308. Data related to the email service is output in the user interface 128 through use of a folders pane 312 which illustrates different folders used to store email and an email preview pane 314 which may be used to preview email. Text input via the search portion 310 may be used to search through the items (e.g., email in this instance) accessible via the email service.

The search portion 310 may also be used to search for items in other services. For example, the search portion 310 and the service bar 308 may be configured for output in the user interface 128 such that these portions are displayed with each of the services. When a user enters characters (e.g., text) into the search portion 310, the user may then select a different service, in which, to perform the search. Additionally, the user may continue to select different services are see results of the search in those services without reentering the characters. In this way, the user is continually provided access to the searching functionality and may perform the searches in a currently displayed service as well as in other services without reentering the search query each time. Further discussion of searches and search user interfaces may be found in relation to the following figures.

Exemplary Procedures

The following discussion describes preview and refining techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 4:
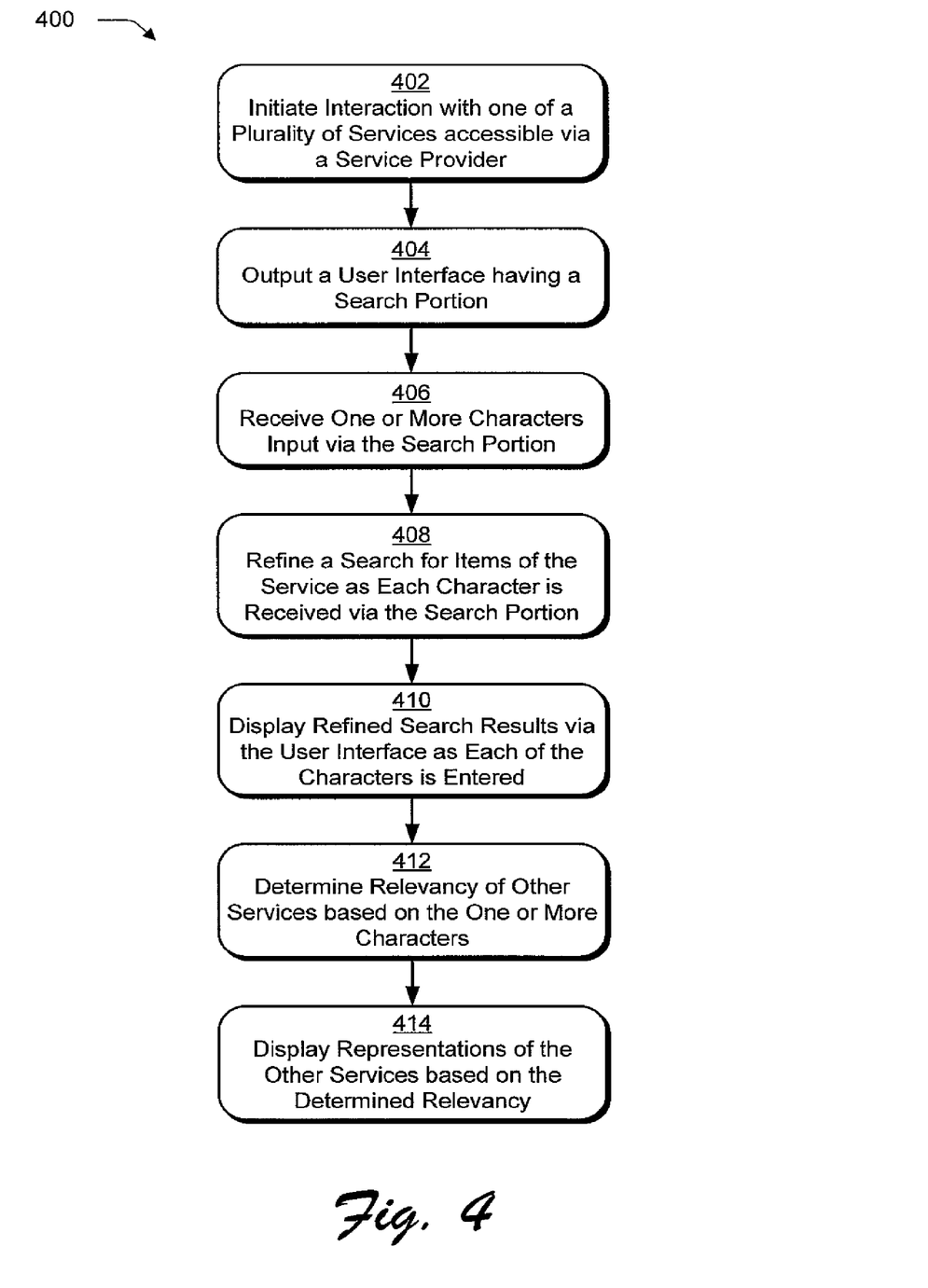
FIG. 4 is a flow diagram depicting a procedure in an exemplary implementation in which services and items displayed in a user interface are refined as a user enters characters in a search portion of the user interface.

FIG. 4 depicts a procedure 400 in an exemplary implementation in which services and items displayed in a user interface are refined as a user enters characters in a search portion of the user interface. During the discussion of the procedure 400 of FIG. 4, reference will also be made to an exemplary implementation 500 of a user interface shown in FIG. 5.

Interaction is initiated with one of a plurality of services that is accessible via a service provider (block 402). For example, the client 104(*n*) may execute a communication module 130(*n*) configured as a browser and navigate over the network 106 to a network address of the service provider 102(*m*). The client 104(*n*) may also provide authentication information, such as name and password, to authenticate the client's 104(*n*) identity.

Through interaction with the service provider, the client 104(*n*) receives data that is used to form a user interface. The user interface is output by the client 104(*n*) and includes a search portion (block 404). For example, the user interface 302 of FIG. 3 includes a menu bar 304 and address bar 306 formed by the communication module 130(*n*). The user interface 302 also includes the user interface 128 formed from data obtained from the service provider 102(*m*), which includes a service bar 308 and a search portion 310. The search portion 310 is configured to accept characters to perform a search.

Figure 5:
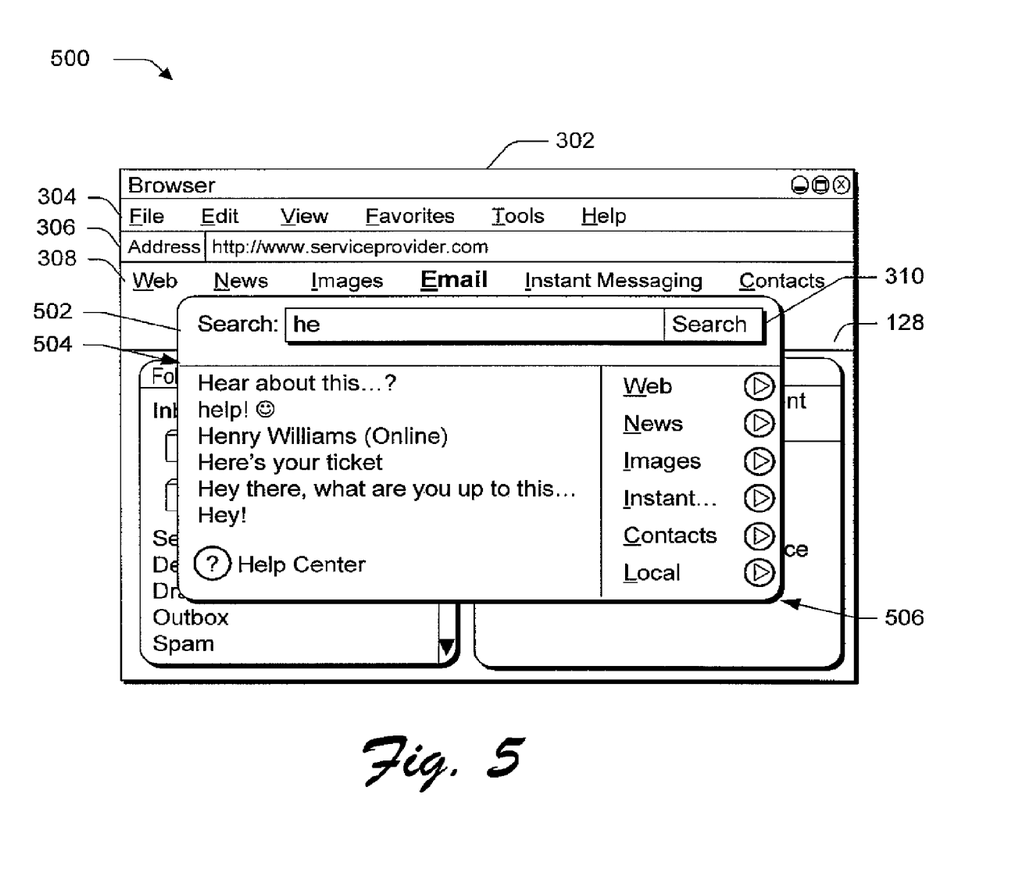
FIG. 5 is an illustration of an exemplary user interface that is operable to refine items and services displayed in the user interface based on characters entered in the search portion as described in the procedure of FIG. 4.

One or more characters are received via the search portion (block 406). For instance, as illustrated in FIG. 5, the search portion 310 has received the character "h" and then the character "e". A search for items of the service is refined and the results of which displayed as each character is received via the search portion (blocks 408, 410). For instance, when an initial character is received (e.g., the character "h"), the user interface 128 outputs an overlay 502 having items in the service (e.g., the emails of the illustrated email service) that have that character. When a subsequent character is received (e.g., the character "e"), items 504 in that service (e.g., email) which have both characters (e.g., "h" and "e") are displayed. In this way, the search may be continually refined and provide feedback to the user such that the user may continue to enter text until a desired item is located.

Services 506 that are represented in the user interface 128 may also be refined. For example, a determination may be made as to the relevancy of other services (e.g., services other than the one currently being displayed) to the one or more characters (block 412). Representations of the other services may then be displayed based on the determined relevancy (block 414). For instance, the determination of relevancy may be performed as each of the characters is entered, when identifiable words are detected (e.g., "picture", "news"), and so on. Services that are relevant may then be included in the user interface 128, further arranged within the user interface 128 based on relative relevancy to the characters being entered, provided with indications of relative relevancy (e.g., bolding, bars displayed proximally to the service that are filled as relevancy increases, output of a value, and so on), determined which services are included in the user interface 128, and so on. Thus, the representations of services may be displayed in a variety of ways in the user interface based on the determined relevancy.

Figure 6:
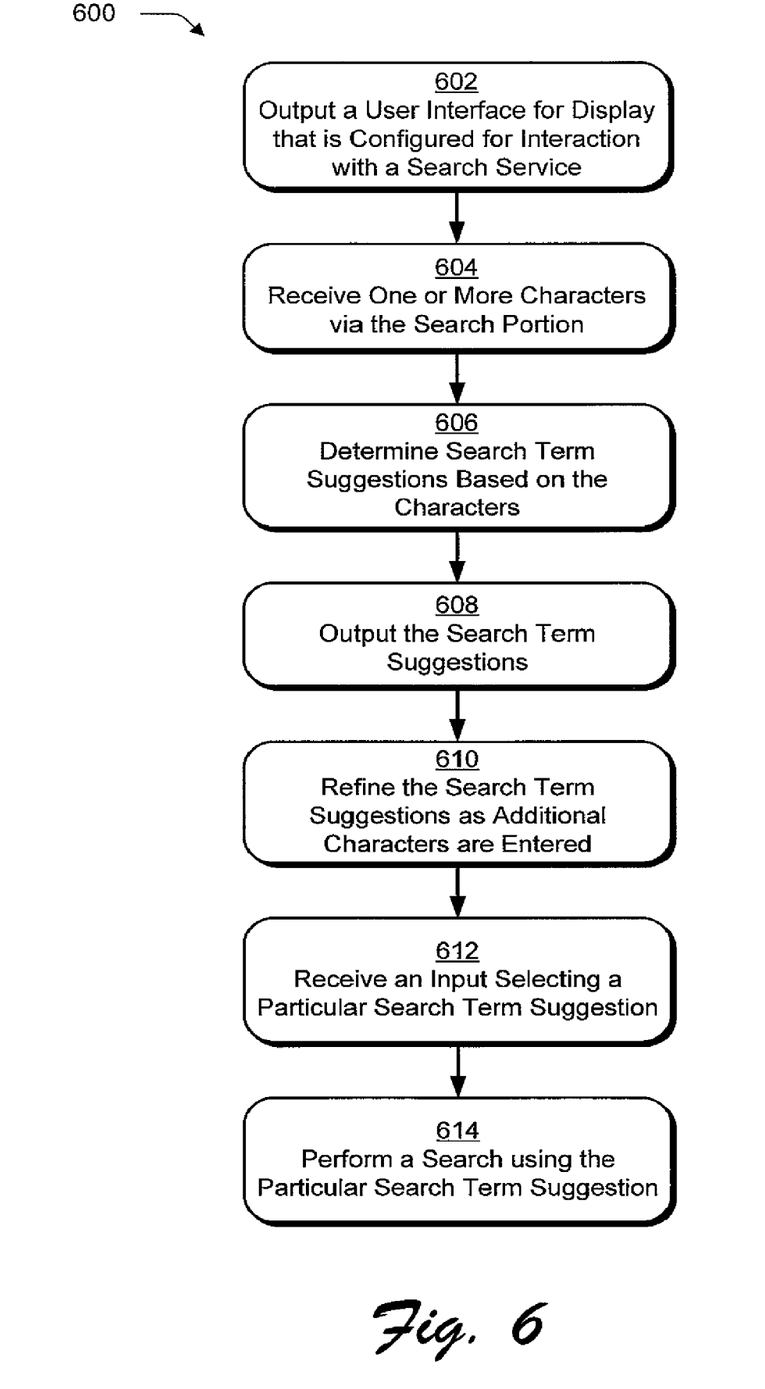
FIG. 6 is a flow diagram depicting a procedure in an exemplary implementation in which search term suggestions for an Internet search are refined in a user interface.

FIG. 6 depicts a procedure 600 in an exemplary implementation in which search term suggestions for an Internet search are refined in a user interface. During the discussion of the procedure 600 of FIG. 6, reference will also be made to an exemplary implementation 700 of a user interface shown in FIG. 7.

Figure 7:
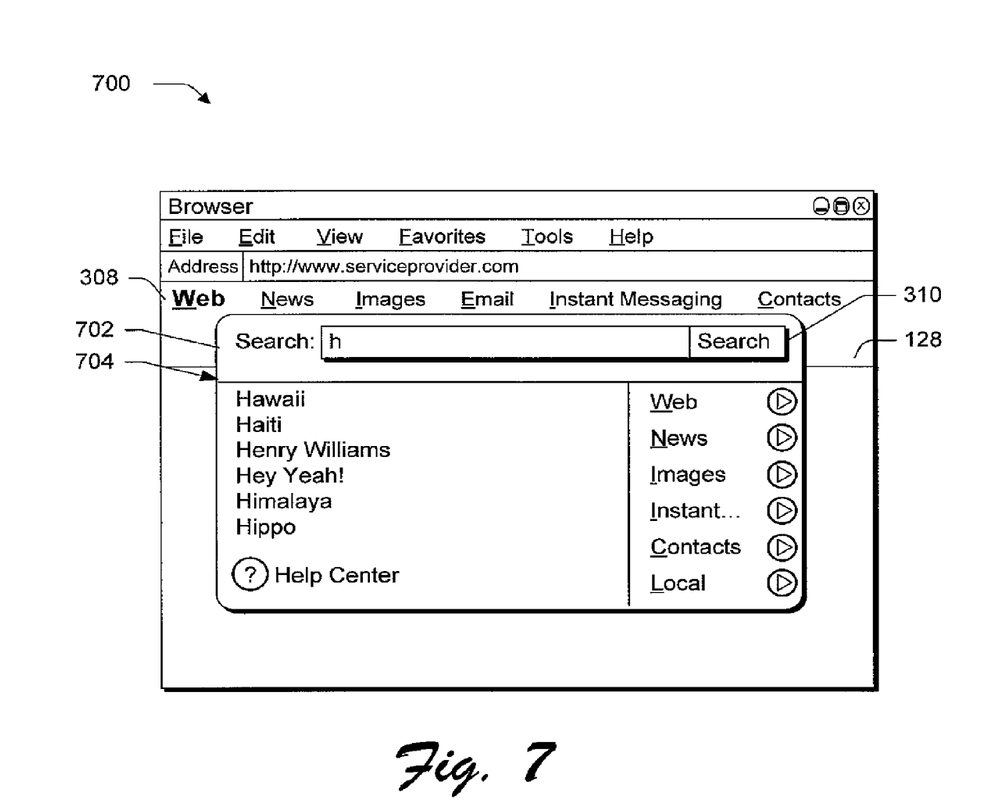
FIG. 7 is an illustration of an exemplary user interface that is operable to refine search term suggestions as described in the procedure of FIG. 6.

A user interface is output for displayed that is configured for interaction with a search service (block 602). For example, the user interface 128 of FIG. 7 is illustrated as interacting with an Internet search service through bolding of the representation of "Web" in the service bar 308. One or more characters are received via the search portion (block 604) and a determination is made of search term suggestions based on the characters (block 606), which are then output (block 608).

The search portion 310, for instance, is illustrated in FIG. 7 as having the character "h", which causes an overlay 702 to be output. The overlay 702 includes a plurality of search term suggestions 704 that are based on the entered character. As before, the search term suggestions may continue to be refined as the user enters characters into the search portion 310.

Additionally, the search terms suggestions may be selectable to cause a corresponding search to be performed. For instance, an input may be received that selects a particular search term suggestion (block 612), e.g., by "clicking" the search term suggestion "Himalaya" through use of a cursor control device. In response to the input, a search is performed using the particular search term suggestion (block 614).

The search term suggestions may be provided in a variety of ways. For example, the search term suggestions may be provided by the service provider 102(*m*) from a listing of most common searches performed by the plurality of clients 104(*n*). Thus, the search term suggestion may be based on other information (e.g., other searches) apart from data that was entered previously by that particular client that is requesting the search. In this way, the search term suggestion may provide functionality beyond that of completing entry of a search query that was previously requested at the client. In another example, the search term suggestions are suggestions for search and are not a search themselves. For example, the search term suggestion may be configured as terms that are processed by an Internet search service to obtain a search result of network addresses having that content. For instance, the search term suggestions may be terms used to obtain a search result having uniform resource locators (URLs) of content that corresponds to the terms. A variety of other examples are also contemplated.

Figure 8:
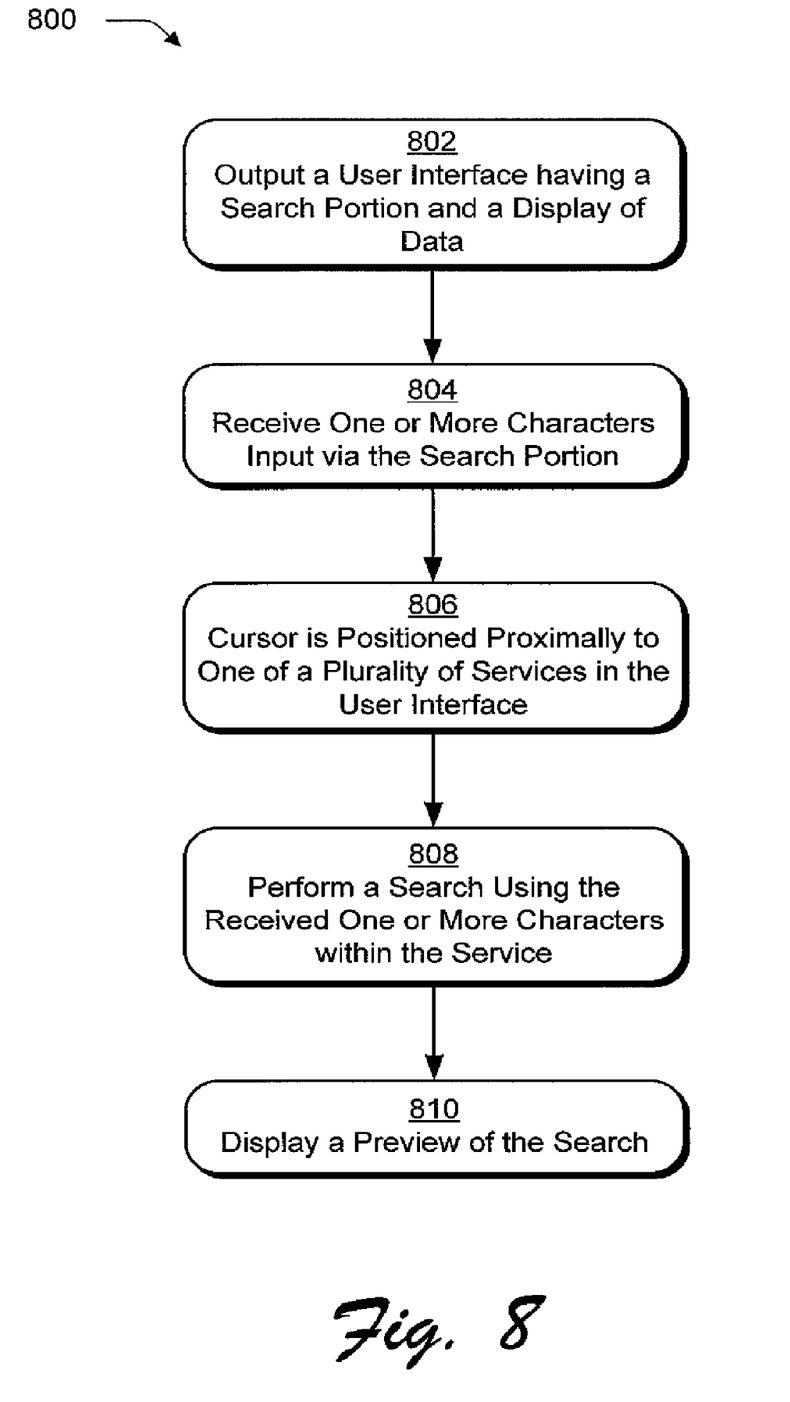
FIG. 8 is a flow diagram depicting a procedure in an exemplary implementation in which a preview is provided of a search of a service when a cursor is positioned proximally to the service.

FIG. 8 depicts a procedure 800 in an exemplary implementation in which a preview is provided of a search of a service when a cursor is positioned proximally to the service. During the discussion of the procedure 800 of FIG. 8, reference will also be made to an exemplary implementation 900 of a user interface shown in FIG. 9.

A user interface is output having a search portion and a display of data (block 802). For example, the user interface 128 of FIG. 9 includes a display of data to interact with an email service as previously described in relation to FIG. 3. As before, one or more characters are received that were input via the search portion (block 804). Continuing with the previous example, the search portion 310 has received the characters "Himalaya". These characters, as previously described, may be utilized to search for items accessible via a currently displayed service (e.g., the email service of FIG. 9) as well as to search for items accessible via other services, e.g., the image service, instant messaging service, and so on.

Figure 9:
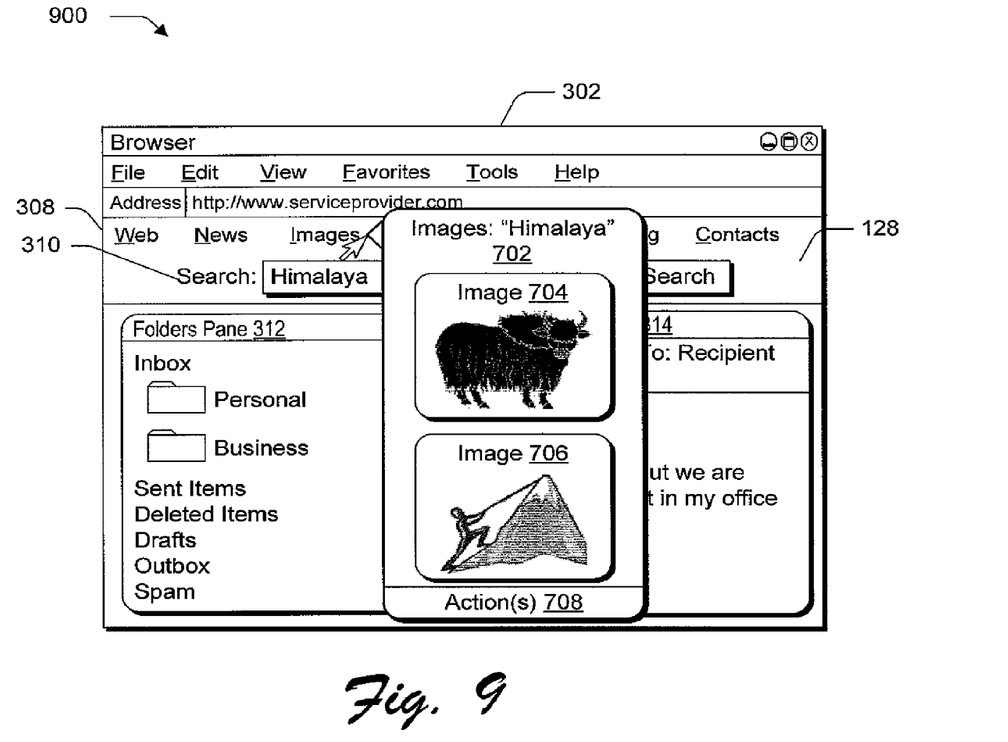
FIG. 9 is an illustration of an exemplary user interface that is operable to provide a preview as described in the procedure of FIG. 8.

A cursor is positioned proximally to one of the plurality of services in the user interface (block 806). The user, for instance, may use a cursor control device to position the cursor proximally to the "image" service representation in the service bar 308. In response to the positioning, a search is performed using the received one or more characters within the respective service (block 808). For example, a search may be performed for images that correspond to the "Himalaya" text input in the search portion 310. A preview of the search is then displayed (block 810). The preview may be configured in a variety of ways. In FIG. 9, for instance, the preview is provided as an overlay 702 that includes the most relevant images 704, 706 of the search. This process may be performed for each of the services in the service bar 308 such that a user may preview searches in those services without leaving interaction with a current service, e.g., the email service in this example.

Actions may also be performed using the preview. For example, the user may interact with the email service to find a particular message regarding a movie. Therefore, the user may enter characters describing the movie in the search portion 310 and cause the search to be performed. Results of the search may be displayed as an overlay as shown in FIG. 5 as well as a list of additional related searches that may be performed in relation to other services, such as "web", "news", "images", and so on, such as in the service bar 308, in the overlay itself; and so on. If the user is interested in one or more of the other services in relation to the input characters, the user may move the cursor over these services to obtain a preview. For example, the user may position the cursor next to the "images" service to output an overlay 702 near the cursor that contains a few images related to the movie that were found online. The overlay 702 may also include a listing of one or more actions 708 that may be performed using the items in the preview. For example, one of the actions may be operable to cause an email to be formed that contains the images. Therefore, when the user selects that action, an email may be formed and automatically populated with the contents of the preview. Although use of an email and images has been described, it should be apparent that a variety of actions may be performed and that leverage results of the search shown in the preview.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method of search preview on a user interface, the method comprising:

initiating interaction with one of a plurality of services accessible via a service provider;

displaying a search portion of the user interface, the search portion being configured to interact with a search service and a display of data;

receiving one or more characters input via the search portion of the user interface;

determining that a cursor is positioned proximally to a representation of one of the plurality of services in the user interface after the one or more characters are received, wherein the representation of one of the plurality of services is selected from a group consisting of:

email service;

instant messaging service;

Internet search service;

image search service;

web log service;

ecommerce service; and news service, in response to determining that the cursor is positioned proximally to the representation of the email service, displaying an overlay comprising:

a folders pane configured to display a plurality of folders representing email storage locations;

an email preview pane configured to display a preview of email;

in response to determining that the cursor is positioned proximally to the representation of the image search service, displaying the overlay including a selection of images based on the received one or more characters input via the search portion of the user interface;

in response to determining that the cursor is positioned proximally to the representation of one of the plurality of services, displaying the overlay within the user interface comprising:

a list of most relevant search term suggestions and actions associated with the one of the plurality of services containing the received one or more characters, a search performed using the received one or more characters and one of the plurality of services positioned proximally to the cursor;

a list of services, the list of services comprising services other than the one of the plurality of services positioned proximally to the cursor, the list of services displayed based on a determined relevancy;

the determined relevancy performed as one or more characters are received;

refining the displayed overlay as each additional character is entered via the search portion; and in an event the cursor is re-positioned proximally to the representation of a second service of the plurality of services, changing the overlay to present results associated with the second service, based on the received one or more characters and the second service of the plurality of services positioned proximally to the re-positioned cursor, the changing occurring while still maintaining an interaction with the one of the plurality of services.

2. The method as described in claim 1, further comprising displaying the list of services in the overlay of the user interface in response to receipt of an initial character via the search portion.

3. The method as described in claim 1, further comprising providing an indication of the relative relevancy of the representations of the plurality of services being displayed comprises bolding a representation of the service.

4. The method as described in claim 1, wherein in response to determining that the cursor is positioned proximally to the representation of the image service, displaying the overlay including the selection of most relevant images based on the received one or more characters input via the search portion of the user interface.

5. A method for providing a search preview in a user interface, the method comprising:
    outputting the user interface for display, the user interface configured to interact with a search service, the user interface comprising:
        a menu bar including drop-down menus of commands;
        an address bar configured to receive and display current network addresses from which the user interface receives content;
        a service bar portion comprising a list of available search services;
        a search portion configured to receive one or more characters used to perform a search; and
        an overlay comprising:
            a list of search term suggestions based on the received one or more characters; and
            an other list of search services;
    when one or more characters are received via the search portion, displaying on the overlay the other list of search services based upon a relative relevancy of a particular search service to the one or more characters received via the search portion;
    selecting one of the available search services listed in the service bar portion of the user interface, and providing an indication of the selected one of the available search services;
    searching the selected one of the available search services using the received one or more characters; and
    displaying the list of search term suggestions having the one or more characters, wherein:
        the displayed list is refined as each character is entered via the search portion; and
        in an event a second search service in the service bar portion of the user interface is selected, searching the selected second search service while maintaining the interaction with the previously selected one of the available search services, and using the received one or more characters, displaying the list of search term suggestions having the one or more characters, and refining the displayed list as each character is entered via the search portion.

6. The method as described in claim 5, wherein the list of search term suggestions is not displayed until an initial character is received.

7. The method as described in claim 5, wherein the other list of search services is displayed after an initial character is received.

8. The method as described in claim 5, wherein
    the one or more search term suggestions are selectable to cause an Internet search to be performed.

9. The method as described in claim 8, wherein at least one search term suggestion is not a search query that was stored previous to the one or more characters by a client device that performs the outputting and the displaying.

10. The method as described in claim 8, wherein:
    the search term suggestions do not include Uniform Resource Locators (URLs); and
    the Internet search performed using the one or more search term suggestions produces a search result having URLs.

11. The method as described in claim 5, wherein the overlay provides an indication of the selected one of the services comprises bolding a representation of the service in the service bar portion of the user interface.

12. One or more computer-readable storage media comprising computer executable instructions that, when executed, direct a computer to output a user interface that includes:
    a search portion configured to accept one or more characters;
    a service bar configured to interact with services, the service bar includes presentations of a plurality of services available from a service provider over a network, wherein each representation is configured to display a preview of a search performed using the accepted one or more characters by a respective service when a cursor is positioned proximally to the representation; and
    an overlay hat includes a list of search term suggestions based on the accepted one or more characters and an other list of representations of services, the other list of representations displayed based on a determined relevancy, and at least one representation is displayed with indicia which indicates a relative relevancy of the at least one representation over at least one other representation;
    wherein when the cursor is re-positioned proximally to the representation of a second service in the service bar, the overlay changes to present results associated with the second service, based on the accepted one or more characters and the second service positioned proximally to the re-positioned cursor, without leaving the interaction with the respective service.

13. One or more computer-readable storage media as described in claim 12, wherein:
    the representations are output with the search portion when the user interface displays data from each service; and
    the search portion is output in conjunction with each service.

14. One or more computer-readable storage media as described in claim 12, wherein the computer executable instructions further configure the user interface to output one or more search term suggestions based on the one or more characters when the search portion is displayed in conjunction with a particular service that is configured as an Internet search service.

15. One or more computer-readable storage media as described in claim 14, wherein the one or more search term suggestions are selectable to cause an Internet search to be performed.

16. One or more computer-readable storage media as described in claim 12, wherein the search portion is displayable proximally to the representations in the service bar portion of the user interface.

17. One or more computer-readable storage media as described in claim 12, wherein the representation is displayed with indicia comprising a value which indicates the relative relevancy of the representation over another representation.

18. One or more computer-readable storage media as described in claim 12, wherein the overlay provides an indication of the selected one of the services comprises bolding a representation of the service in the service bar portion of the user interface.

19. One or more computer-readable storage media as described in claim 12, wherein the representations displayed in the other list of services do not include the representation of the respective service in the service bar currently displaying the preview of the search performed using the accepted one or more characters.

* * * * *